US010232855B2

(12) United States Patent
Matsumoto et al.

(10) Patent No.: US 10,232,855 B2
(45) Date of Patent: Mar. 19, 2019

(54) DRIVE ASSIST APPARATUS (71) Applicant: TOYOTA JIDOSHA KABUSHIKI KAISHA, Toyota-shi (JP)

(72) Inventors: Satoru Matsumoto, Nagoya (JP); Kentaro Takahashi, Toyota (JP); Masato Endo, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/425,227

(22) Filed: Feb. 6, 2017

(65) Prior Publication Data

US 2017/0144673 A1  May 25, 2017

Related U.S. Application Data (63) Continuation of application No. 14/234,327, filed as application No. PCT/JP2012/067651 on Jul. 11, 2012, now Pat. No. 10,112,620.

(30) Foreign Application Priority Data

Jul. 20, 2011  (JP) ................................. 2011-158765

(51) Int. Cl.
*B60K 6/20* (2007.10)
*H04M 1/02* (2006.01)
(Continued)

(52) U.S. Cl.
CPC .............. *B60W 50/08* (2013.01); *B60K 35/00* (2013.01); *B60L 11/1848* (2013.01);
(Continued)

(58) Field of Classification Search
None
See application file for complete search history.

(56) References Cited

U.S. PATENT DOCUMENTS 4,800,100 A * 1/1989 Herbots ................ C23C 14/221
117/105
5,487,002 A * 1/1996 Diller ...................... B60L 1/003
320/128
(Continued)

FOREIGN PATENT DOCUMENTS

CN    101765765 A    6/2010
DE    198 07 291 A1   8/1999
(Continued)

OTHER PUBLICATIONS

Office Action dated Dec. 3, 2013 in the corresponding Japanese Patent Application No. 2011-158765 (Partial English Translation only).
(Continued)

*Primary Examiner* — Jean Paul Cass
(74) *Attorney, Agent, or Firm* — Oblon, McClelland, Maier & Neustadt, L.L.P.

(57) ABSTRACT

An electronic control unit (11) of a drive assist apparatus (10) acquires electric power source identification information for identifying a source of an electric power currently charged in a battery and electric power amount information representing an electric power amount corresponding to the source from an electric power acquisition unit (14), thereby recognizing a battery remaining amount SOCrg representing a green electric power, a battery remaining amount SOCj representing a privately generated green electric power, and a battery remaining amount SOCrs representing a non-green electric power. The unit (11) presents travelable ranges each formed by connecting a group of maximum reachable points to which a PHV can reach by using each of a battery total remaining amount SOCr and the battery remaining amounts SOCrg, SOCj, and SOCrs to a user (driver) by using an information presentation unit (12).

6 Claims, 4 Drawing Sheets

US 10,232,855 B2
Page 2

(51) Int. Cl.

| | | |
|---|---|---|
| *H04W 4/80* | (2018.01) | |
| *B60K 35/00* | (2006.01) | |
| *B60L 11/18* | (2006.01) | |
| *B60W 20/12* | (2016.01) | |
| *B60W 40/12* | (2012.01) | |
| *B60W 50/08* | (2012.01) | |
| *G01C 21/34* | (2006.01) | |
| *G01C 21/36* | (2006.01) | |
| *G09B 29/00* | (2006.01) | |
| *G09B 29/10* | (2006.01) | |

(52) U.S. Cl.
CPC ........ *B60L 11/1862* (2013.01); *B60W 20/12* (2016.01); *B60W 40/12* (2013.01); *G01C 21/3469* (2013.01); *G01C 21/3667* (2013.01); *G01C 21/3676* (2013.01); *G09B 29/007* (2013.01); *G09B 29/10* (2013.01); *B60K 6/20* (2013.01); *B60K 2350/1076* (2013.01); *B60L 2240/622* (2013.01); *B60L 2240/72* (2013.01); *B60L 2250/16* (2013.01); *B60L 2260/52* (2013.01); *B60L 2260/54* (2013.01); *B60W 2510/244* (2013.01); *B60W 2550/402* (2013.01); *B60W 2750/40* (2013.01); *B60Y 2200/92* (2013.01); *H04M 1/0202* (2013.01); *H04W 4/80* (2018.02); *Y02T 10/6269* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 10/84* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/169* (2013.01); *Y04S 30/14* (2013.01); *Y10S 903/903* (2013.01)

(56) References Cited

U.S. PATENT DOCUMENTS

| 5,539,399 | A | | 7/1996 | Takahira et al. | |
|---|---|---|---|---|---|
| 5,815,824 | A | * | 9/1998 | Saga | B60K 6/46 |
| | | | | | 701/22 |
| 6,105,138 | A | * | 8/2000 | Arakawa | G06F 1/263 |
| | | | | | 307/31 |
| 7,181,337 | B2 | * | 2/2007 | Kosaka | F01N 3/208 |
| | | | | | 701/110 |
| 8,332,096 | B2 | * | 12/2012 | Riegelman | B60W 20/00 |
| | | | | | 701/34.4 |
| 8,417,401 | B2 | * | 4/2013 | Takahara | B60L 11/123 |
| | | | | | 701/22 |
| 9,132,746 | B2 | * | 9/2015 | Enomoto | B60L 11/1862 |
| 2003/0006914 | A1 | | 1/2003 | Todoriki et al. | |
| 2008/0236912 | A1 | * | 10/2008 | Ueoka | B60K 6/26 |
| | | | | | 180/65.265 |
| 2009/0082957 | A1 | | 3/2009 | Agassi et al. | |
| 2010/0010697 | A1 | | 1/2010 | Soma et al. | |
| 2010/0049389 | A1 | * | 2/2010 | Ando | B60W 10/24 |
| | | | | | 701/22 |
| 2010/0094496 | A1 | * | 4/2010 | Hershkovitz | B60L 3/12 |
| | | | | | 701/22 |
| 2010/0138098 | A1 | * | 6/2010 | Takahara | B60L 11/123 |
| | | | | | 701/31.4 |
| 2010/0138142 | A1 | * | 6/2010 | Pease | B60L 11/1851 |
| | | | | | 701/123 |
| 2010/0195110 | A1 | | 8/2010 | Iwai et al. | |
| 2011/0001356 | A1 | | 1/2011 | Pollack | |
| 2011/0112710 | A1 | | 5/2011 | Meyer-Ebeling et al. | |
| 2011/0224868 | A1 | | 9/2011 | Collings, III et al. | |
| 2012/0179311 | A1 | * | 7/2012 | Skaff | B60L 11/1861 |
| | | | | | 701/22 |
| 2012/0316781 | A1 | * | 12/2012 | Krauss | G01C 21/3469 |
| | | | | | 701/454 |
| 2013/0024112 | A1 | * | 1/2013 | Tate, Jr. | B60L 11/1862 |
| | | | | | 701/439 |
| 2013/0173097 | A1 | * | 7/2013 | Jotanovic | G01C 21/3469 |
| | | | | | 701/22 |
| 2014/0142836 | A1 | * | 5/2014 | Yabuta | B60W 10/06 |
| | | | | | 701/123 |
| 2015/0323974 | A1 | * | 11/2015 | Shuster | H04M 1/72563 |
| | | | | | 713/320 |

FOREIGN PATENT DOCUMENTS

| DE | 10 2009 016 869 A1 | 10/2010 |
|---|---|---|
| DE | 102009040968 | 3/2011 |
| DE | 10 2009 048 784 A1 | 4/2011 |
| JP | 7-85397 A | 3/1995 |
| JP | 2001-112121 A | 4/2001 |
| JP | 2003-21522 A | 1/2003 |
| JP | 2008-82944 A | 4/2008 |
| JP | 2009-025128 A | 2/2009 |
| JP | 2009-25128 A | 2/2009 |
| JP | 2010-169423 A | 8/2010 |
| JP | 2011-98693 A | 5/2011 |
| WO | WO 2010/005052 A2 | 1/2010 |

OTHER PUBLICATIONS

Office Action dated May 15, 2017 in German Patent Application No. 11 2012 003 013.3 (with English translation).

* cited by examiner

DRIVE ASSIST APPARATUS

CROSS-REFERENCE TO RELATED APPLICATION

This application is a continuation of and claims the benefit of priority under 35 U.S.C. § 120 from U.S. application Ser. No. 14/234,327, filed Jan. 22, 2014, which is a national stage of International Application No. PCT/JP2012/067651, filed Jul. 11, 2012, which is based upon and claims the benefit of priority under 35 U.S.C. § 119 from Japanese Patent Application No. 2011-158765, filed Jul. 20, 2011, the entire contents of each of which are incorporated herein by reference.

TECHNICAL FIELD

The present invention relates to a drive assist apparatus for assisting a drive of a vehicle, and more particularly, to a drive assist apparatus for assisting a drive of a vehicle by presenting an accessible range by using the vehicle.

BACKGROUND ART

Hitherto, for example, an information presentation apparatus disclosed in Patent Literature 1 has been known. The related-art information presentation device includes an interface operated by a user, current position information acquisition means for acquiring a current position of the vehicle, remaining amount detection means for detecting a charged state of the vehicle and detecting a remaining amount of an electric power as a driving energy source, reception means for receiving these types of information, storage means for storing information required for calculating a cruising distance and editing path information, cruising distance calculation means for calculating the cruising distance based on the remaining amount of energy of the vehicle, editing means for setting a travelable range based on the calculated cruising distance and editing the path information to be presented to the user, and output means for presenting the edited path information to the user. As a result, when the user travels to a destination by driving the electric vehicle, a range of possible stopovers is superimposed and displayed on a map for presentation while assuring arrival of the destination without charging on the way, and hence the user can easily determine whether the electric vehicle can reach the destination without charging while making a stopover, and thus can drive without worrying about the energy state.

Moreover, hitherto, for example, a display apparatus for a vehicle disclosed in Patent Literature 2 has also been known. The related-art display device for a vehicle is applied to a hybrid vehicle having a plurality of travel modes, and includes a display part for displaying map information, and a control part for controlling the display part so that the display part displays the travel mode of the vehicle corresponding to a road on a road portion of the map information in a recognizable manner. As a result, a driver can know in advance future information on switching of the travel mode (EV mode or HV mode) of the hybrid vehicle depending on the road to be traveled.

Moreover, hitherto, for example, a navigation system for an electric vehicle disclosed in Patent Literature 3 has also been known. The related-art navigation system for an electric vehicle is connected to travel control means having a function of providing travel control for setting a travel state of the electric vehicle to any one of a normal travel mode and an economy travel mode. As a result, map information of the navigation system can be taken into the travel control means, thereby displaying to a driver a vehicle state such as a reachable range of the vehicle as map information easy to understand, and the travel control means provides the travel control in any one of the normal travel mode and the economy travel mode, thereby enabling a secured arrival to a destination while permitting at least minimum intention of the driver.

Moreover, hitherto, for example, a display apparatus for an electric vehicle disclosed in Patent Literature 4 has also been known. The related-art display apparatus for an electric vehicle displays a current position of an own vehicle on a road map displayed on a screen depending on map information read from a storage medium based on a detected location of the own vehicle, acquires a travelable distance of the vehicle from a consumed amount of electric power of a battery for traveling on a road having a predetermined geography depending on geographical information on each road on the road map read from the storage medium based on a detected remaining capacity of the battery, and displays a travelable range from the current position of the own vehicle on the road map based on the acquired travelable distance of the vehicle.

Further, hitherto, for example, a map display apparatus disclosed in Patent Literature 5 has also been known. The related-art map display apparatus acquires a current SOC value of a battery of a hybrid vehicle, road shapes and gradient information around the vehicle, traffic information, learned information, and the like, calculates a travelable range of the vehicle after a charge for each of a plurality types of charge period of the battery based on the respective pieces of acquired information, and simultaneously displays the plurality of calculated travelable ranges on the liquid crystal display.

CITATION LIST

Patent Literature

[PTL 1] JP 2003-21522 A
[PTL 2] JP 2008-82944 A
[PTL 3] JP 2001-112121 A
[PTL 4] JP 07-85397 A
[PTL 5] JP 2009-25128 A

SUMMARY OF INVENTION

Technical Problem

By the way, in recent years, there is an increasing tendency to protect the earth environment such as prevention of global warming. Then, from a view point of the preservation of the earth environment, research on the hybrid vehicle and the electric vehicle is actively carried out, and research on the plug-in hybrid vehicle (PHV) is also active in order to further decrease a load on the environment and to increase convenience. An installed battery can be externally charged via a charge station on the PHV, and a driver (user) of the PHV can thus charge the battery by using electric powers acquired by different electric power generation methods such as solar electric power generation and wind electric power generation extremely low in emission of $CO_2$, which is a greenhouse effect gas, and thermal electric power generation high in emission of $CO_2$, namely, electric powers different in source of generation. Then, the PHV can travel by a driving power of a motor using the electric power thus charged in the battery and a driving power by an internal combustion engine, and can thus greatly contribute to the preservation of the earth environment.

In this case, there is a tendency that a user (driver) high in awareness of the preservation of the earth environment desires to charge the battery of the PHV used by the user by using the electric power generated by the solar electric power generation, the wind electric power generation, and the like extremely low in the emission amount of the greenhouse effect gas, namely, so-called green electric power, and to travel by using the charged green electric power. On this occasion, the respective above-mentioned related-art apparatus and systems do not distinguish whether the green electric power is used or not, but simply calculates the travelable range (cruising distance) of the vehicle depending on the charged amount of the battery and presents the travelable range to the driver. In other words, the respective related-art apparatus and systems cannot distinguish whether the electric power charged in the battery is an electric power charged by using the green electric power or not, and the travelable range (cruising distance) presented to the driver is thus only the travelable range (cruising distance) depending on the total charged amount of the battery.

In this case, for the user (driver) as high in awareness of the preservation of the earth environment as using the PHV, the information presented by the related-art apparatus and systems is not sufficient in a situation where the use of a specific energy (specifically, the green electric power) is prioritized. Thus, it is desired to clearly present information relating to the sources of the electric power different in the electric power generation method to the user (driver) so as to clarify whether absence/presence of contribution to the preservation of the earth environment, thereby satisfying the intention of the user (driver) high in awareness of the preservation of the earth environment.

The present invention has been devised to address the above-mentioned problem, and has an object to provide a drive assist apparatus for clarifying sources of energies used for traveling, and appropriately presenting a travelable range of a vehicle to assist the drive.

A drive assist apparatus according to one embodiment of the present invention for achieving the above-mentioned object is configured to assist a driver driving a vehicle that travels by using at least an electric power externally supplied to and charged in a battery installed thereon by superimposing and displaying a travelable range on a vicinity map including a current position of the vehicle. Then, the feature of the drive assist apparatus according to one embodiment of the present invention resides in: determining, for the electric power externally supplied to and charged in the battery, a travelable range of the vehicle for each electric power identified by electric power source information for identifying a source of the supplied electric power based on an electric power generation method; and superimposing and displaying the determined travelable ranges of the vehicle for the respective identified electric powers on the vicinity map of the vehicle in a distinguishable manner, to present the travelable ranges to the driver of the vehicle. Further, in this case: the vehicle may travel by further using a driving power of an internal combustion engine; and the drive assist apparatus may be configured to: determine each of the travelable ranges of the vehicle using each of the identified electric powers as well as a travelable range of the vehicle using the driving power of the internal combustion engine; and superimpose and display the determined travelable ranges of the vehicle using the respective identified electric powers and the determined travelable range of the vehicle using the driving power of the internal combustion engine on the vicinity map of the vehicle in a distinguishable manner, to present the travelable ranges to the driver of the vehicle.

More specifically, the feature of the drive assist apparatus according to one embodiment of the present invention resides in including: identification information acquisition means; cruising distance calculation means; travelable range determination means; and travelable range presentation means.

The identification information acquisition means acquires, for the electric power externally supplied to and charged in the battery, at least electric power source identification information for identifying a source of the supplied electric power based on an electric power generation method. The cruising distance calculation means calculates, for each electric power charged in the battery and identified by the electric power source identification information acquired by the identification information acquisition means, a cruising distance of the vehicle using the each identified electric power. The travelable range determination means determines, by using each of the cruising distances of the vehicle calculated for each of the identified electric powers by the cruising distance calculation means, a travelable range of the vehicle for the each of the identified electric powers. The travelable range presentation means superimposes and displays the travelable ranges of the vehicle using the respective identified electric powers determined by the travelable range determination means on the vicinity map of the vehicle in a distinguishable manner, to present the travelable ranges to the driver of the vehicle.

In this case, it is preferred that: the vehicle travel by further using a driving power of an internal combustion engine; the cruising distance calculation means calculate each of the cruising distances of the vehicle using each of the identified electric powers as well as a cruising distance of the vehicle using the driving power of the internal combustion engine; the travelable range determination means determine the travelable range of the vehicle using the each of the identified electric powers, as well as determine a travelable range of the vehicle using the driving power of the internal combustion engine by using the cruising distance of the vehicle using the driving power of the internal combustion engine calculated by the cruising distance calculation means; and the travelable range presentation means superimpose and display the travelable ranges of the vehicle using the respective identified electric powers and the travelable range of the vehicle using the driving power of the internal combustion engine, which are determined by the travelable range determination means, on the vicinity map of the vehicle in a distinguishable manner, to present the travelable ranges to the driver of the vehicle.

Then, in those cases, it is preferred that the electric power source identification information be information for identifying a green electric power having a source generated by an electric power generation method using a natural energy low in environmental load and a non-green electric power having a source other than the source of the green electric power.

As a result, when the driver (users including passengers) moves around by using a vehicle that travels by using at least an electric power externally supplied to and charged in an installed battery, specifically, an electric vehicle (EV), a plug-in hybrid vehicle (PHV), or the like, the travelable range based on the electric power charged in the battery is superimposed on the vicinity map and presented, and hence the user can extremely easily and surely recognize the accessible range by using the electric power charged in the battery. Consequently, as long as the vehicle travels in the presented travelable range, the user can drive the vehicle at ease to move around (move).

Moreover, when the user moves around by using a vehicle that travels by using an electric power externally supplied to and charged in an installed battery as well as using a driving power of an internal combustion engine, specifically a PHV or the like, the travelable range based on the electric power charged in the battery and the travelable range using the driving power of the internal combustion engine are superimposed and presented on the vicinity map in a distinguishable manner, and hence the user can extremely easily and surely recognize the range of action using the vehicle (specifically, the PHV).

Then, in those cases, the travelable range presentation means uses the identification information acquisition means, the cruising distance calculation means, and the travelable range determination means to distinguish the electric powers charged in the battery from one another depending on the sources and present the travelable ranges superimposed on the vicinity map to the user. As a result, the user can move around by using the vehicle while the user is aware of the sources of the electric power charged in the battery. On this occasion, as the sources of the electric power charged in the battery and distinguished from each other, the green electric power and the non-green electric power can be distinguished from each other. Thus, particularly an environmentally-conscious user can extremely easily satisfy (realize) the intention to prioritize the use of the green electric power, for example, by following the information presented by the travelable range presentation means.

Moreover, another feature of the drive assist apparatus according to one embodiment of the present invention resides in that the travelable range of the vehicle is determined as a travelable range for making a round trip of the vehicle departing from a current position to return to the current position again. More specifically, in a case where the drive assist apparatus includes the travelable range determination means, the travelable range determination means can determine, based on the cruising distance of the vehicle calculated by the cruising distance calculation means, the travelable range of the vehicle for the case where the vehicle departs from the current position and returns again to the current position. As a result, for example, when the user intends to act by using only the electric power charged in the battery, the user can extremely easily recognize the travelable range that requires no battery charge in the course of his/her destination or on his/her way home.

Moreover, another feature of the drive assist apparatus according to one embodiment of the present invention resides in that when the vehicle moves from one determined travelable range of the vehicle to another travelable range during travel, the movement between the travelable ranges is notified to the driver of the vehicle. More specifically, in a case where the drive assist apparatus includes the travelable range presentation means, when the vehicle moves from one travelable range of the vehicle determined by the travelable range determination means to another travelable range during travel, the travelable range presentation means notifies the driver of the vehicle of the movement between the travelable ranges.

In this case: the electric power source identification information may be information for identifying a green electric power having a source generated by an electric power generation method using a natural energy low in environmental load and a non-green electric power having a source other than the source of the green electric power; and when the vehicle moves from, among the determined travelable ranges of the vehicle, a travelable range for traveling by using the green electric power to a travelable range for traveling by using the non-green electric power, the movement between the travelable ranges and necessity for charge of the battery with the green electric power may be notified to the driver of the vehicle. More specifically, in a case where the drive assist apparatus includes the identification information acquisition means and the travelable range presentation means, the electric power source identification information acquired by the identification information acquisition means may be information for discriminating the green electric power having a source generated by an electric power generation method using a natural energy low in environmental load and the non-electric power having other sources from each other, and, when the vehicle moves from a travelable range for traveling by using the green electric power to a travelable range for traveling by using the non-green electric power among the travelable ranges of the vehicle determined by the travelable range determination means, the travelable range presentation means may notify the driver of the vehicle of the movement between the travelable ranges and notify the driver of necessity of the charge of the battery with the green electric power.

Then, in this case, the drive assist apparatus may further include navigation means for detecting the current position of the vehicle and searching for a path to a predetermined location to guide the path, and, when the vehicle moves from, among the travelable ranges of the vehicle determined by the travelable range determination means, a travelable range for traveling by using the green electric power to a travelable range for traveling by using the non-green electric power: the navigation means may be controlled to search for a path to a charge station for charging the battery with the green electric power; and the found charge station may be notified to the driver of the vehicle. More specifically, in a case where the drive assist apparatus includes the travelable range determination means, the travelable range presentation means may control the navigation means to search for a path to a charge station capable of charging the battery with the green electric power, and the found charge station may be notified to the driver of the vehicle.

As a result, when a travelable range in which the vehicle is traveling moves (is changed) to another travelable range, for example, the movement can be notified to the user by means of a sound message, and hence the user can extremely easily recognize the current travelable range, in other words, which energy is used to travel (move around). Particularly, an environmentally-conscious user can easily recognize whether the green electric power is used or not by means of the notified information (message), and further, because the necessity of the charge with the green electric power is notified upon the movement to a travelable range using the non-green electric power, the user can charge the battery with the green electric power at the guided charge station if the charge is necessary, for example. As a result, the user can extend the travelable range using the green electric power, and hence the intention to prioritize the use of the green electric power can be surely satisfied (realized).

Moreover, another feature of the drive assist apparatus according to one embodiment of the present invention resides in that the travelable ranges of the vehicle are superimposed and displayed on the vicinity map of the vehicle in colors different for each travelable range, to present the travelable ranges to the driver of the vehicle. Specifically, in a case where the drive assist apparatus includes the travelable range presentation means and the travelable range determination means, the travelable range presentation means may superimpose and display the travelable ranges of the vehicle determined by the travelable range determination means on the vicinity map of the vehicle in colors different for each travelable range, to present the travelable ranges to the driver of the vehicle. Then, in this case, the travelable ranges of the vehicle for the respective identified electric powers may be superimposed and displayed on the vicinity map of the vehicle in colors different for each travelable range, to present the travelable ranges to the driver of the vehicle. Specifically, in a case where the drive assist apparatus includes the travelable range presentation means and the travelable range determination means, the travelable range presentation means may superimpose and display the travelable ranges of the vehicle for the respective identified electric powers determined by the travelable range determination means on the vicinity map of the vehicle in colors different for each travelable range, to present the travelable ranges to the driver of the vehicle.

As a result, the user can extremely easily and instantaneously recognize the travelable ranges. Moreover, the superimposed display of the travelable ranges of the vehicle for the respective identified electric powers in different colors eliminates necessity of superimposing a travelable range of the vehicle using the driving power of the internal combustion engine in a different color, which is generally vast. Consequently, the user easily recognizes the travelable ranges of the vehicle for the respective identified electric powers, and the vicinity map becomes easy to recognize.

Moreover, another feature of the drive assist apparatus according to one embodiment of the present invention resides in that the drive assist apparatus is configured to set a usage order of the electric powers charged in the battery and identified by the electric power source identification information. More specifically, the drive assist apparatus may include electric power usage order setting means for setting a usage order of the electric powers charged in the battery and identified by the electric power source identification information acquired by the identification information acquisition means. As a result, a user can select and set the usage order of the electric powers charged in the battery and being different in source, and thus, for example, a user who wants to positively use the green electric power can appropriately reflect his/her own intention, and can move around by using the vehicle while contributing to the preservation of the earth environment.

Moreover, another feature of the drive assist apparatus according to one embodiment of the present invention resides in that the travelable range determination means, for example, determines distances along which the vehicle travels from the current position on a plurality of available roads, specifies a location where the determined distance is shorter than the cruising distance of the vehicle calculated by the cruising distance calculation means for each of the plurality of available roads, and connects a group of the specified locations to each other to determine the travelable range of the vehicle. Then, in this case, for example, the travelable range determination means may set a section for each predetermined angular range over an entire circumference in a circumferential direction of the vehicle, determine a location having a maximum straight-line distance from the current position of the vehicle from among the specified locations included in each of the set sections, and connect the determined locations for the respective sections to each other to determine the travelable range.

As a result, the locations on the roads to be actually travelled by the vehicle can be specified by using the cruising distance of the vehicle, and the travelable range of the vehicle can be determined by connecting a group of the locations to each other. Thus, the travelable range of the vehicle can be determined more precisely, namely, more precisely meeting an actual condition. Then, in this case, sections each having a predetermined angular range are set around the vehicle, and the location having the maximum straight-line distance from the current position of the vehicle is determined in the each section, thereby more easily and more efficiently determining the travelable range of the vehicle.

Moreover, another feature of the drive assist apparatus according to one embodiment of the present invention resides in a drive assist apparatus for assisting a driver driving a vehicle that travels by using at least an electric power externally supplied to and charged in a battery installed thereon by superimposing and displaying a travelable range on a vicinity map including a current position of the vehicle, the vehicle traveling by further using a driving power other than the electric power charged in the battery, the drive assist apparatus being configured to: determine a travelable range of the vehicle using the electric power charged in the battery and a travelable range of the vehicle using the driving power other than the electric power charged in the battery; and superimpose and display the determined travelable range of the vehicle using the electric power charged in the battery and the determined travelable range of the vehicle using the driving power other than the electric power charged in the battery on the vicinity map of the vehicle in a distinguishable manner, to present the travelable ranges to the driver of the vehicle.

As a result, the travelable range of the vehicle using the electric power charged in the battery installed on the vehicle (an electric power supplied from the outside as well as, for example, an electric power regenerated by a motor or generated by a fuel cell or the like installed on the vehicle) and the travelable range of the vehicle using the driving power (such as a driving power obtained by an internal combustion engine using a fossil energy or a driving power obtained by an electric power directly supplied from a fuel cell using hydrogen energy such as a hydrogen gas) other than the electric power charged in the battery installed on the vehicle (namely, other energy) can be superimposed and presented on the vicinity map in a distinguishable manner. As a result, the user can extremely easily and surely recognize a range of activity in a so-called EV travel mode using the electric power charged in the battery, and a range of activity in a so-called HV travel mode using a driving power other than the electric power charged in the battery or in a travel mode using an electric power supplied from a fuel cell installed on a fuel cell vehicle. As a result, as long as the vehicle travels in the presented travelable range, the user can drive the vehicle at ease to move around (move).

DESCRIPTION OF EMBODIMENTS a. First Embodiment

A description is now given of a drive assist apparatus 10 (hereinafter also simply referred to as "this apparatus 10") according to an embodiment of the present invention referring to the drawings.

Such a situation that a user (driver) moves around by using a plug-in hybrid vehicle (PHV) having a battery chargeable from outside installed thereon, and includes a motor driven by an electric power charged in the battery and further includes an internal combustion engine in addition to the motor is assumed in the embodiment of the present invention. A detailed configuration and operation of the PHV are not directly relevant to the present invention, and are widely known, and a description and illustration thereof are therefore omitted.

The user (driver) of the PHV appropriately selects an EV travel mode for traveling by only using a driving power of the motor using the electric power charged in the installed battery and an HV travel mode for traveling by using both the driving power of the motor and a driving power of the internal combustion engine, thereby causing the PHV to travel. On this occasion, when the PHV travels in the EV travel mode, an accessible range which the user can take is determined by an electric power amount charged in the battery (the electric power amount is hereinafter also referred to as "battery remaining amount"). In this case, as widely known for the PHV, an electric power from a commercial electric power supply generally supplied from the electric power company as well as a green electric power generated by a natural energy low in emission of a green house effect gas and a toxic gas, and low in load on the environment (a renewable energy such as solar energy, geothermal energy, wind energy, hydraulic energy, and biomass energy) can be charged in the battery via a charge station or the like installed on a home or a public charge facility. In other words, as environment awareness of the user (driver) increases, when the user (driver) drives the PHV in the EV travel mode, the user (driver) can positively use the green electric power.

Figure 1:
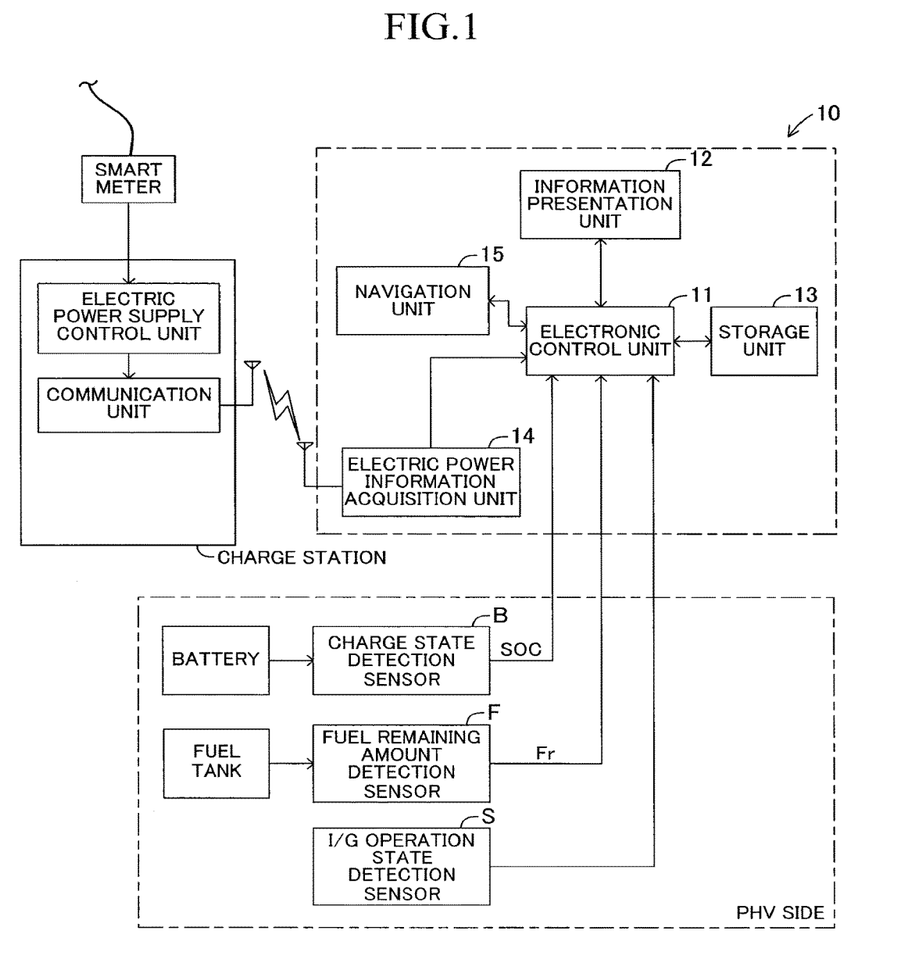
FIG. 1 is a schematic diagram illustrating a configuration of a drive assist apparatus according to the present invention.

This apparatus 10 can be installed at least on the PHV, distinguishes an accessible range (corresponding to a travelable range based on a cruising distance) in the EV travel mode and an accessible range (corresponding to a travelable range based on a cruising distance) in the HV travel mode from each other, and further presents a cruising distance by the green electric power and a cruising distance by the electric power other than the green electric power in the EV travel mode in a distinguishable manner, thereby assisting the drive of the PHV by the user (driver). For this purpose, as schematically illustrated in FIG. 1, this apparatus 10 includes an electronic control unit 11 (cruising distance calculation means and travelable range determination means), an information presentation unit 12 (travelable range presentation means), a storage unit 13, an electric power information acquisition unit 14 (identification information acquisition means), and a navigation unit 15 (navigation means), which are connected to one another for mutual communication. On this occasion, as this apparatus 10, an onboard information terminal apparatus installed on the PHV for presenting various types of information to the user (driver), or a portable information terminal apparatus (such as a cellular phone, a smartphone, a tablet terminal, and a notebook personal computer) held and carried by the user (driver) can be used.

The electronic control unit 11 is a microcomputer including a CPU, a ROM, and a ROM as major components, and executes various programs including a presentation program described later, thereby performing overall control on operations of this apparatus 10. On this occasion, the electronic control unit 11 includes a well-known interface for electrically connecting in a wireless or wired manner to various electronic control units and various sensors installed on the vehicle (namely, PHV), and the electronic control unit 11 can thus acquire the travel state of the vehicle and the like. In this embodiment, as illustrated in FIG. 1, the various sensors installed on the vehicle (PHV) include at least a charge state detection sensor B as battery remaining amount acquisition means for detecting an SOC (state of charge) representing a charged state of the battery installed on the PHV, namely, an electric power amount charged in the battery, a fuel remaining amount detection sensor F as fuel remaining amount detection means for detecting a fuel filled state of a fuel tank installed on the PHV, namely, a remaining amount of a fuel filled in the fuel tank, and an I/G operation state detection sensor S for detecting an operation state of an activation switch (ignition switch) of the PHV.

The information presentation unit 12 is constructed by a liquid crystal display part, a sound output part, and the like, and displays various accessible ranges (various travelable ranges) described later by using characters and graphics, and maps, found paths, and the like by the navigation unit 15, and outputs sounds by following the control of the electronic control unit 11, thereby presenting (notifying) the various information to the user (driver). The storage unit 13 includes a storage medium such as a hard disk or a semiconductor memory and a drive apparatus for the storage medium, and stores various programs and data required for the electronic control unit 11 to perform overall control on the operations of this apparatus 10 in advance or in an updatable manner.

When the battery installed on the PHV is charged, the electric power information acquisition unit 14 acquires electric power source identification information for identifying a source of an electric power to be charged (specifically, whether the electric power is a green electric power or not based on a difference in electric power generation method) and a supplied amount (charged amount) of the identified electric power via a charge station by means of short distance wireless communication. A brief description is now given of the charge station installed at home and a public place. The charge station is briefly illustrated in FIG. 1, and includes an electric power supply control unit and a communication unit. Then, the electric power supply control unit acquires the electric power source identification information on the electric power which can currently be supplied from the charge station to the PHV, and the communication unit transmits the electric power source identification information to the electric power information acquisition unit 14 by means of the short distance wireless communication.

The electric power source identification information is supplied to the electric power supply control unit by, for example, a smart meter installed near the charge station specifying an electric power generation method at a supply source. Specifically, when the supply source of the electric power is, for example, a solar electric power generation system, the electric power currently supplied is a green electric power by the solar electric power generation, and the smart meter thus outputs information representing the green electric power as the electric power source identification information to the electric power supply control unit. On this occasion, when the supplied electric power is a green electric power generated by the solar electric power generation system installed on a residential house, in particular, the smart meter outputs information representing the privately generated green electric power as the electric power source identification information to the electric power supply control unit. On the other hand, when the supply source of the electric power is, for example, a thermal electric power plant, the electric power currently supplied is an electric power by the thermal electric power generation, and is not a green electric power (an electric power which is not a green electric power is hereinafter referred to as "non-green electric power"), and the smart meter thus outputs information representing the non-green electric power as the electric power source identification information to the electric power supply control unit.

Moreover, the electric power information acquisition unit 14 can appropriately charge the battery of the PHV while acquiring the charged amount by means of the short distance wireless communication. Specifically, the electric power information acquisition unit 14 transmits/receives various types of information on the charging (such as a request code and a response code for the charging, ID information for specifying the PHV (namely, the user), and the SOC of the battery) at a preset cycle to/from the electric power supply control unit of the charge station. As a result, the electric power supply control unit of the charge station supplies a desired electric power amount based on the SOC of the battery acquired from the PHV side, and transmits electric power amount information representing a supplied electric power amount via the communication unit. Thus, the electric power information acquisition unit 14 acquires the electric power amount information via a communication antenna, thereby acquiring the charged amount of the battery of the PHV. On this occasion, the electric power information acquisition unit 14 receives and acquires the electric power amount information transmitted along with the electric power source identification information, thereby recognizing details of the electric power currently charged in the battery of the PHV, namely, an electric power amount of the green electric power and an electric power amount of the non-green electric power.

The navigation unit 15 includes a global positioning system (GPS) signal detection sensor, and a speed sensor for detecting a travel speed (corresponding to a vehicle speed). Then, the navigation unit 15 uses various types of data stored in advance in the storage unit 13 or various types of data acquired via an external communication unit (not shown) from outside, thereby searching for a path to a predetermined location (such as a destination specified by the user (driver)), and guides the user (driver) along the found path by using the information presentation unit 12.

A detailed description is now given of an operation of this apparatus 10 configured as described above according to the first embodiment. This apparatus 10 presents (notifies) information representing a travelable range of the PHV in the EV travel mode and information representing a travelable range of the PHV in the HV travel mode, namely, accessible ranges of the user by using the PHV, to the user at an appropriate timing, thereby assisting the drive. For this purpose, the electronic control unit 11 executes the presentation program illustrated in FIG. 2. A specific description is now given of the presentation program.

Figure 2:
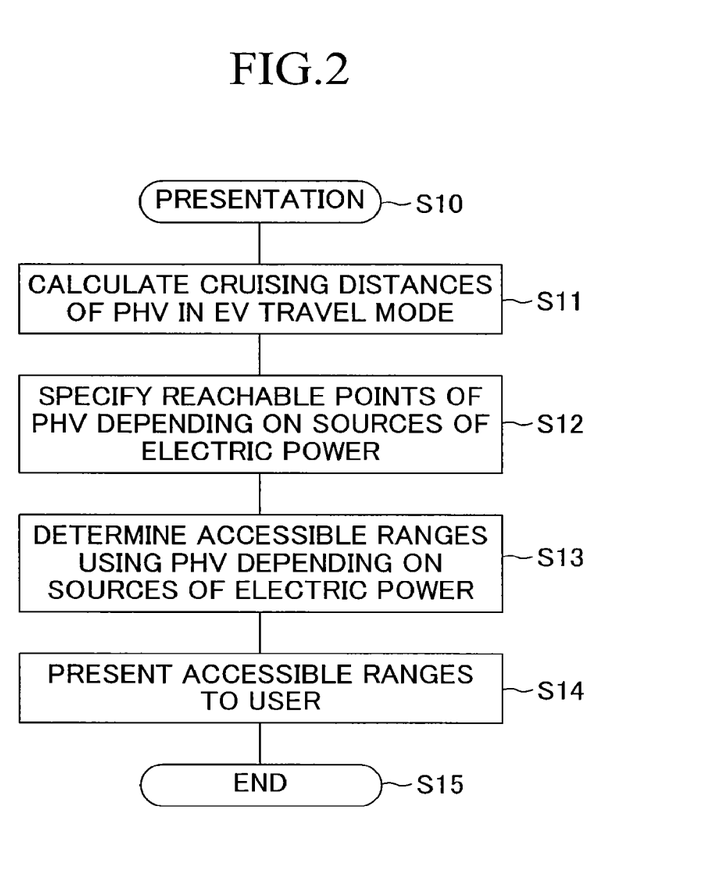
FIG. 2 is a flowchart of a presentation program executed by an electronic control unit of FIG. 1 according to a first embodiment of the present invention.

When the user (driver) operates the ignition switch (or the activation switch) of the PHV to bring the apparatus 10 into an on state, in Step S10, the electronic control unit 11 of this apparatus 10 starts execution of the presentation program illustrated in FIG. 2. Then, subsequently in Step S11, the electronic control unit 11 calculates cruising distances which the PHV can travel in the EV mode.

Specifically, in Step S11, the electronic control unit 11 receives a signal from the charge state detection sensor B provided on the PHV via the interface, and temporarily stores total charge amount information representing a current battery total remaining amount SOCr of the battery installed on the PHV at a predetermined storage location in the storage unit 13. Moreover, the electronic control unit 11 acquires the electric power source identification information and the electric power amount information from the electric power information acquisition unit 14, and recognizes, out of the battery total remaining amount SOCr, a battery remaining amount SOCrg representing an electric power amount charged by a green electric power, a battery remaining amount SOCj representing an electric power amount charged by a green electric power privately generated, and a battery remaining amount SOCrs representing an electric power amount charged by a non-green electric power, based on the acquired respective pieces of information. Then, the electronic control unit 11 distinguishes green electric power charged amount information representing the battery remaining amount SOCrg, privately generated green electric power charged amount information representing the battery remaining amount SOCj, and non-green electric power charged amount information representing the battery remaining amount SOCrs from one another, and temporarily stores the respective pieces of information at predetermined locations in the storage unit 13.

Moreover, the electronic control unit 11 acquires an electric power consumption rate D (this consumption rate is hereinafter referred to as "electric mileage D") of the battery in the EV travel mode, which is stored at a predetermined storage location in the storage unit 13, and set in advance for each model of the PHV. Then, the electronic control unit 11 respectively divides the battery total remaining amount SOCr represented by the total charge amount information, the battery remaining amount SOCg represented by the green electric power charged amount information, the battery remaining amount SOCj represented by the privately generated green electric power charged amount information, and the battery remaining amount SOCs represented by the non-green electric power charged amount information, which are temporarily stored, by the electric mileage D. As a result, the electronic control unit 11 calculates the maximum cruising distance Lr which the PHV can travel in the EV travel mode by dividing the battery total remaining amount SOCr by the electric mileage D, a cruising distance Lg along which the PHV can travel in the EV travel mode by using the green electric power by dividing the battery remaining amount SOCg by the electric mileage D, a cruising distance Lj along which the PHV can travel in the EV travel mode by using the privately generated green electric power by dividing the battery remaining amount SOCj by the electric mileage D, and a cruising distance Ls along which the PHV can travel in the EV travel mode by using the non-green electric power. In this way, after the electric control unit 11 calculates the cruising distance Lr, the cruising distance Lg, the cruising distance Lj, and the cruising distance Ls, the electric control unit 11 proceeds to Step S12.

Moreover, this embodiment is carried out while it is assumed that the electric mileage D is set for each vehicle model of the PHV as described above. In this case, the electric mileage D can change depending on, for example, a drive mode (a drive style) of the PHV by the user (driver). Therefore, for example, an electric mileage D for a past travel of the PHV by the user (driver) may be calculated, and the calculated electric mileage D may be updated to be stored in a database (so-called learning of the electric mileage D).

In Step S12, the electronic control unit 11 cooperates with the navigation unit 15 to specify points reachable by using roads on which the PHV can travel around the current point as a center (this road is hereinafter referred to as "path"), namely, reachable points respectively by using the cruising distance Lr, the cruising distance Lg, the cruising distance Lj, and the cruising distance Ls calculated for the respective sources of electric power in Step S11. A detailed description is now given of the specifying processing in Step S12.

First, a description is given of the determination of the paths by the navigation unit 15. The navigation unit 15 uses various detected values detected by the GPS signal detection signal, the speed sensor, and the like, which are not shown, to specify the current position of the PHV by means of a well-known method. Then, the navigation unit 15 acquires map information (more specifically, road data) representing a wide area map having the specified current position of the PHV as the center out of the various types of data stored at the predetermined storage locations in the storage unit 13. Then, the navigation unit 15 specifies roads on which the PHV can travel, namely, paths while considering the current position of the PHV as a center. In this way, the navigation unit 15 specifies the paths on which the PHV can travel while considering the current position of the PHV as the center, and then provides the electronic control unit 11 with map information including the specified paths.

For each of the paths specified by the navigation unit 15, the electronic control unit 11 compares a distance Ld which is assumed to be traveled by the PHV from the current position on the specified path (the distance is hereinafter referred to as "path distance Ld"), and the maximum travelable range Lr calculated in Step S11 to each other, and determines a point where the magnitude of the path distance Ld is smaller than (equal to or smaller than) the magnitude of the maximum cruising distance Lr (the point is hereinafter referred to as "maximum reachable point"). On this occasion, in a case where the PHV travels on the path, for example, when a circle having the PHV as the center and having the maximum cruising distance Lr as the radius is assumed, and the PHV travels on the path up to a point determined by the circle, the distance which the PHV needs to travel before reaching the point varies depending on the path in general. In other words, the paths extending from the current position of the PHV are not always straight lines and include curves and corners in general, and even when the straight-line distance from the center is simply the maximum cruising distance Lr, and is thus the same, the actual path distance Ld varies depending on the path. Thus, the electronic control unit 11 determines the maximum reachable point where the path distance Ld which the PHV travels on the path is smaller than (equal to or smaller than) the maximum cruising distance Lr for each of the paths.

By the way, a situation where the PHV travels to the maximum reachable point is such a case that the total battery remaining amount SOCr charged in the battery is used. In this case, the total battery remaining amount SOCr is the sum of the battery remaining amount SOCg, the battery remaining amount SOCj, and the battery remaining amount SOCs as described above. Thus, the electronic control unit 11 divides the path to the maximum reachable point based on the details of the battery remaining amount, in other words, determines points which the PHV can reach when traveling on the path by respectively using the battery remaining amount SOCg, the battery remaining amount SOCj, and the battery remaining amount SOCs. On this occasion, the electronic control unit 11 determines respective reachable points toward a direction departing from the current position of the PHV by using the battery remaining amounts SOC in order of the battery remaining amount SOCj, the battery remaining amount SOCg, and the battery remaining amount SOCs. In the following description, the point which is reachable by traveling on the path using the battery remaining amount SOCj is referred to as "reachable point by using privately generated green electric power", the point which is reachable by traveling on the path using the battery remaining amount SOCg is referred to as "reachable point by using green electric power", and the point which is reachable by traveling on the path using the battery remaining amount SOCs is referred to as "reachable point by using non-green electric power".

In other words, as in the determination of the maximum reachable point described above, for each of the paths specified by the navigation unit 15, the electronic control unit 11 compares the path distance Ld which the PHV travels on each of the specified paths, and the cruising distance Lj calculated in Step S11 to each other, and determines a point where the magnitude of the path distance Ld is smaller than (equal to or smaller than) the magnitude of the cruising distance Lj, namely, the reachable point by using privately generated green electric power. Moreover, for each of the paths specified by the navigation unit 15, the electronic control unit 11 compares the path distance Ld which the PHV travels on each of the identified paths starting from the determined reachable point by using privately generated green electric power, and the cruising distance Lg calculated in Step S11 to each other, and determines a point where the magnitude of the path distance Lg is smaller than (equal to or smaller than) the magnitude of the cruising distance Lg, namely, a reachable point by using green electric power. Further, the electronic control unit 11 determines a reachable point by using non-green electric power reachable by traveling on the path by using non-green electric power, namely, a point coincident with the maximum reachable point determined as described above. Then, after the electronic control unit 11 determines the maximum reachable point, the reachable point by using privately generated green electric power, the reachable point by using green electric power, and the reachable point by using non-green electric power, which is coincident with the maximum reachable point in this embodiment, the electronic control unit 11 proceeds to Step S13.

In Step S13, the electronic control unit 11 respectively connects a group of the plurality of maximum reachable points (coincident with the group of reachable points by using non-green electric power in this embodiment), a group of the plurality of reachable points by using privately generated green electric power, and a group of the plurality of reachable points by using green electric power, which have been determined for the respective paths in Step S12, to each other, thereby determining a plurality of polygonal areas, namely, accessible ranges reflecting the sources of the electric power. Note that, the points in each of the groups of points are preferably connected to each other so that the planar dimension of the formed polygon is maximum.

Moreover, in this case, the polygon acquired by connecting the points in each of the groups of points to each other is preferably smoothed by means of a well-known method, thereby determining a final area.

On this occasion, regarding the areas determined in this way, the area formed by connecting the group of reachable points by using privately generated green electric power to each other is hereinafter referred to as "privately generated green electric power-use accessible range", the area formed by connecting the group of reachable points by using green electric power to each other is hereinafter referred to as "green electric power-use accessible range", and the remaining area is hereinafter referred to as "non-green electric power-use accessible range". Then, the respective accessible ranges determined in this way are partitioned in order of the privately generated green electric power-use accessible range, the green electric power-use accessible range, and the non-green electric power-use accessible range from the current position of the PHV to a distance.

Further, in Step S13, the electronic control unit 11 determines an area in which the PHV can travel in the HV travel mode by also using the driving power of the internal combustion engine. A brief description is given below of the determination of the travelable area in the HV travel mode.

The electronic control unit 11 receives a signal from the fuel remaining amount detection sensor F provided on the PHV side via an interface, and temporarily stores fuel remaining amount information representing a current fuel remaining amount Fr of the fuel tank installed on the PHV at a predetermined storage location in the storage unit 13. Moreover, the electronic control unit 11 acquires a fuel consumption rate (this consumption rate is hereinafter referred to as "fuel mileage N") in the HV travel mode stored at a predetermined storage location in the storage unit 13 and set in advance for each model of the PHV. Then, the electronic control unit 11 divides the fuel remaining amount Fr by the fuel mileage N, thereby calculating the maximum cruising distance Lrhv along which the PHV can travel in the HV travel mode.

Then, the electronic control unit 11 compares the path distance Ld along which the PHV travels on the path specified by the navigation unit 15 starting from the maximum reachable point determined as described above in the HV travel mode and the calculated maximum cruising distance Lrhv to each other. Then, the electronic control unit 11 determines a location where the magnitude of the path distance Ld is smaller than (equal to or less than) the magnitude of the maximum cruising distance Lrhv for each of the paths. Note that, the location determined in this way is hereinafter referred to as "HV reachable point". When the electronic control unit 11 determines the HV reachable points in this way, the electronic control unit 11 connects the group of the plurality of HV reachable points determined for each path, thereby determining a polygonal area, namely, an accessible range (the accessible range is hereinafter referred to as "HV accessible range") of the user in the HV travel mode. Note that, the group of points are preferably connected to each other so that the area of the formed polygon is maximum. Moreover, in this case, the polygon acquired by connecting each of the groups of points to each other is preferably smoothed by means of a well-known method to thereby determine a final area.

The electronic control unit 11 determines the privately generated green electric power-use accessible range, the green electric power-use accessible range, and the non-green electric power-use accessible range as well as the HV accessible range, and then proceeds to Step S14.

In Step S14, the electronic control unit 11 presents (notifies) the privately generated green electric power-use accessible range, the green electric power-use accessible range, the non-green electric power-use accessible range, and the HV accessible range determined in Step S13 to the user by using the information presentation unit 12. Specifically, the electronic control unit 11 supplies the information presentation unit 12 with drawing data (specifically, coordinate data and the like) required for representing and drawing the respective accessible ranges determined in Step S13. The information presentation unit 12 acquires the supplied drawing data, and acquires map information (specifically, road data) representing a broad area centered around the current position of the PHV from the navigation unit 15. Then, as illustrated in FIG. 3, the information presentation unit 12 displays the map (roads) around the current position of the PHV acquired from the navigation unit 15 on the liquid crystal display unit (display panel), which is not illustrated in detail, and superimposes the privately generated green electric power-use accessible range, the green electric power-use accessible range, the non-green electric power-use accessible range, and the HV accessible range in a distinguishable manner on the map (road) display.

Figure 3:
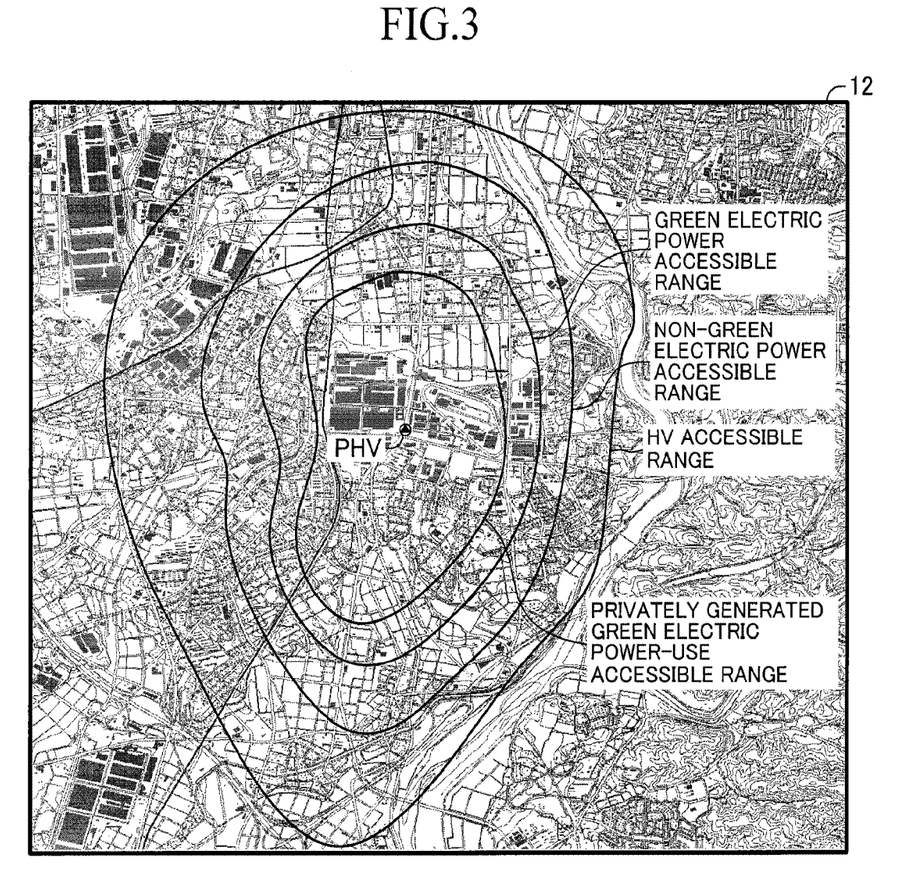
FIG. 3 is a diagram illustrating a presentation form of accessible ranges corresponding to respective sources of an electric power.

In FIG. 3, only line charts (border lines) for distinguishing the respective accessible ranges are superimposed and displayed on the map for the sake of restriction on illustration, but, more preferably, the respective accessible ranges may be displayed in different colors so as to be distinguished from one another. Moreover, in FIG. 3, the HV accessible range is displayed for easy understanding. It should be understood, however, that, in general, the HV accessible range is vaster than the accessible ranges in the EV travel mode and is thus sometimes not displayed on a map in the same scale and that, when the accessible ranges are displayed in different colors, the coloring of the HV accessible range can be omitted so that the map (roads) is easily recognized by the user (driver).

In this way, the information presentation unit 12 presents (notifies) the respective accessible ranges, and the user (driver) can extremely easily understand the range in which the PHV can travel in the EV travel mode. Thus, the user (driver) can move around by using the PHV while the user (driver) is aware of the preservation of the earth environment. Then, when the information presentation unit 12 presents (notifies) the privately generated green electric power-use accessible range, the green electric power-use accessible range, the non-green electric power-use accessible range, and the HV accessible range to the user (driver), the electronic control unit 11 proceeds to Step S15 and finishes execution of the presentation program.

As appreciated from the foregoing description, the information beneficial to the activity of the user (driver) in driving the PHV, namely, the accessible range where the PHV can travel in the EV travel mode and the accessible range where the PHV can travel in the HV travel mode can be presented (notified) to the user (driver) in a distinguishable manner according to the first embodiment. Further, as the accessible range where the PHV can travel in the EV travel mode, the accessible range using green electric power charged in the battery (privately generated green electric power-use accessible range and green electric power-use accessible range) and the accessible range using non-green electric power charged in the battery (non-green electric power-use accessible range) can be presented (notified) to the user (driver) in a distinguishable manner.

Consequently, the user (driver) can extremely easily understand the range in which the PHV can travel in the EV travel mode. As a result, necessity of the charge in the course can be precisely recognized, and uncertainty felt by the user (driver) can be effectively resolved. Moreover, the range of activity by using green energy can be appropriately presented (notified), and hence, particularly, the appropriate information meeting a rise in environmental awareness of the user (driver) can be presented (notified), and, for example, the intention to prioritize the use of the green electric power can be extremely easily satisfied (realized). As a result, the user can appropriately contribute to the environment preservation.

b. Second Embodiment

The first embodiment is realized so that, when the electronic control unit 11 executes the presentation program to determine the privately generated green electric power-use accessible range, the green electric power-use accessible range, the non-green electric power-use accessible range, and the HV accessible range, reachable points on the respective paths specified by the navigation unit 15 are determined. In this case, the number of the reachable points to be determined increases more than necessary depending on the number of specified paths, and hence, when the respective accessible ranges are determined by connecting the reachable points, a heavy load is imposed on the electronic control unit 11. In this embodiment, the load imposed on the electronic control unit 11 can be reduced to efficiently determine the respective accessible ranges. A detailed description is now given of the second embodiment. Like components are denoted by like numerals as of the first embodiment and their descriptions are omitted.

Figure 4:
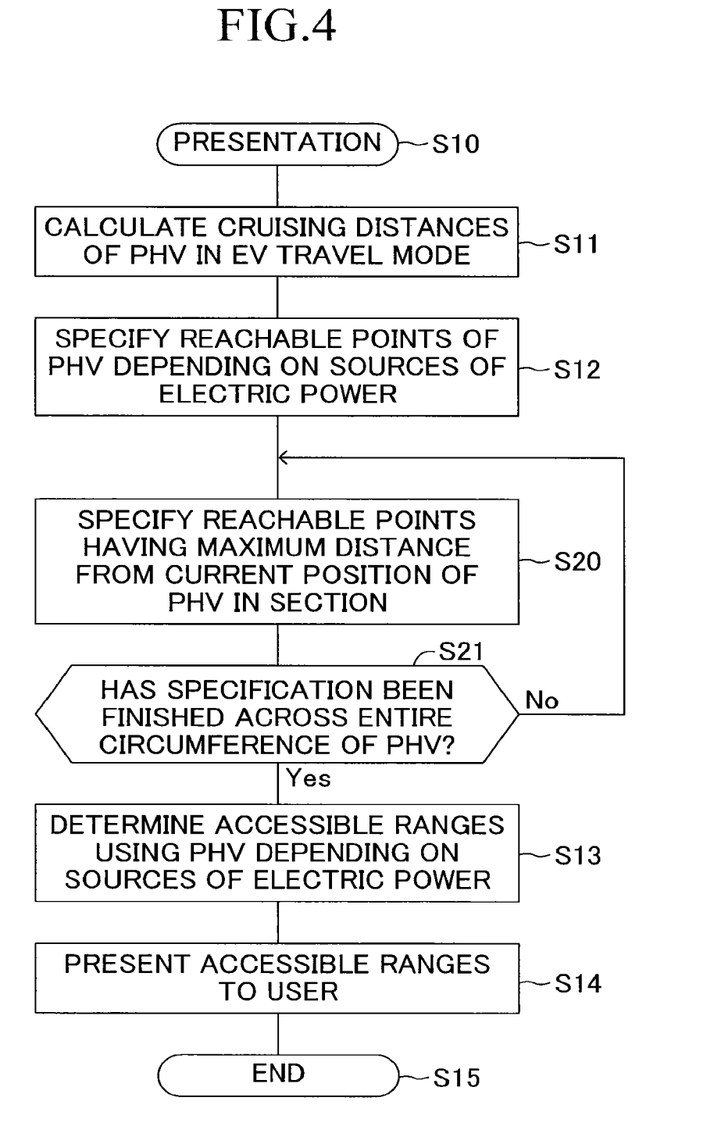
FIG. 4 is a flowchart of the presentation program executed by the electronic control unit of FIG. 1 according to a second embodiment of the present invention.

According to the second embodiment, the electronic control unit 11 executes a presentation program illustrated in FIG. 4. The presentation program according to the second embodiment is slightly different from the presentation program according to the first embodiment in that Steps S20 and S21 for determining the respective accessible ranges are added. Specifically, according to the second embodiment, a unique reachable point in a section around the current position of the PHV set for every predetermined angular range (such as approximately 5°) in a circumferential direction is determined, and a group of the reachable points determined for the respective sections are finally connected to each other, thereby forming the area, namely, the accessible range. A specific description is now given of the added Steps S20 and S21.

As in the first embodiment, the electronic control unit 11 determines the maximum reachable points, the privately generated green electric power-use reachable points, the green electric power-use reachable points, and the non-green electric power-use reachable points as well as the HV reachable points in Step S12 of the presentation program. After the electronic control unit 11 determines the respective reachable points, the electronic control unit 11 proceeds to Step S20.

In Step S20, regarding the reachable points determined in Step S12, the electronic control unit 11 specifies a reachable point having the maximum straight-line distance from the current position of the PHV out of the reachable points existing in the section having the predetermined angular range (such as 5°) in the circumferential direction around the current position of the PHV. Specifically, the electronic control unit 11 sets, for example, the true north as a reference at the current position of the PHV, and acquires the respective reachable points, namely, the maximum reachable points (also in this embodiment, coincident with the non-green electric power-use reachable points), the privately generated green electric power-use reachable points, the green electric power-use reachable points, and the HV reachable points existing in a section acquired by a rotation from the true north by the predetermined angle (such as approximately 5°) toward the east. Then, the electronic control unit 11 specifies a maximum reachable point (non-green electric power-use reachable point), a privately generated green electric power-use reachable point, a green electric power-use reachable point, and an HV reachable point each having the maximum straight-line distance from the current position of the PHV in the section from among the acquired maximum reachable points (non-green electric power-use reachable points), the acquired privately generated green electric power-use reachable points, the acquired green electric power-use reachable points, and the acquired HV reachable points, respectively.

On this occasion, each of the maximum reachable point (non-green electric power-use reachable point), the privately generated green electric power-use reachable point, the green electric power-use reachable point, and the HV reachable point specified in Step S20 is a point having the maximum straight-line distance from the current position of the PHV among the plurality of points in the set section, namely, one point specified in the section. In this case, for example, in a case where any of the maximum reachable point (non-green electric power-use reachable point), the privately generated green electric power-use reachable point, the green electric power-use reachable point, and the HV reachable point does not exist in the section or in a case where the respective reachable points having the maximum straight-line distance from the current position of the PHV do not exist in the successive two sections, the reachable points may exist on a border between the sections, and hence the sections need to be set by reducing the predetermined angular interval in this case. As a result, each of the reachable points can be surely specified in each of the sections.

Then, in Step S21, the electronic control unit 11 determines whether or not the processing of specifying the maximum reachable point (non-green electric power-use reachable point), the privately generated green electric power-use reachable point, the green electric power-use reachable point, and the HV reachable point each having the maximum straight-line distance from the current position of the PHV in the area in Step S20 has been completed across the circumferential direction of the PHV. Specifically, when the electronic control unit 11 has set the sections across the entire periphery of the PHV, in other words, over 360° and has specified the respective reachable points, the electronic control unit 11 makes determination "Yes", and proceeds to Step S13. On the other hand, when the electronic control unit 11 has not set the sections across the entire periphery (360°) of the PHV and has not specified the respective reachable points, the electronic control unit 11 makes determination "No", and returns to Step S20 to carry out the processing of Step S20.

When the maximum reachable point (non-green electric power-use reachable point), the privately generated green electric power-use reachable point, the green electric power-use reachable point, and the HV reachable point each having the maximum straight-line distance from the current position of the PHV are specified for each of the sections set across the circumferential direction of the PHV, the electronic control unit 11 carries out the respective pieces of step processing subsequent to Step S13 as in the first embodiment.

In other words, the electronic control unit 11 connects each of the group of the plurality of maximum reachable points (also in this embodiment, coincident with the group of non-green electric power-use reachable points), the group of the plurality of privately generated green electric power-use reachable points, the group of the plurality of green electric power-use reachable points, and the group of the plurality of HV reachable points determined for each of the sections in Step S20 and existing in the circumferential direction of the PHV. Note that, also in the second embodiment, when the group of reachable points are connected to each other, the points are preferably connected to each other so that a planar dimension of a formed polygonal area is maximum, and the area is preferably determined finally by smoothing following a well-known method. As a result, also in the second embodiment, the electronic control unit 11 partitions the accessible ranges in order of the privately generated green electric power-use accessible range, the green electric power-use accessible range, the non-green electric power-use accessible range, and the HV accessible range from the current position of the PHV as the center to a distance.

Then, subsequently in Step S14, the electronic control unit 11 presents (notifies) the privately generated green electric power-use accessible range, the green electric power-use accessible range, the non-green electric power-use accessible range, and the HV accessible range determined in Step S13 to the user by using the information presentation unit 12. Note that, also in this case, the information presentation unit 12 displays, as illustrated in FIG. 3, the map (roads) around the current position of the PHV acquired from the navigation unit 15, and superimposes the privately generated green electric power-use accessible range, the green electric power-use accessible range, the non-green electric power-use accessible range, and the HV accessible range on the map (road) display in a distinguishable manner in different colors, for example. Then, the electronic control unit 11 finishes the execution of the presentation program in Step S15.

In this way, according to the second embodiment, the sections are set around the PHV, and the unique reachable points can be specified in the sections to determine the respective accessible ranges. As a result, the load imposed on the electronic control unit 11 can be reduced, and the respective accessible ranges can be efficiently determined.

Moreover, the information beneficial to the activity of the user (driver) in driving the PHV, namely, the accessible range where the PHV can travel in the EV travel mode and the accessible range where the PHV can travel in the HV travel mode can be presented (notified) to the user (driver) in a distinguishable manner also according to the second embodiment. Further, also according to the second embodiment, as the accessible range where the PHV can travel in the EV travel mode, the accessible ranges using the green electric power charged in the battery (privately generated green electric power-use accessible range and the green electric power-use accessible range) and the accessible range using the non-green electric power charged in the battery (non-green electric power-use accessible range) can be presented (notified) to the user (driver) in a distinguishable manner.

Consequently, the user (driver) can extremely easily recognize the range where the PHV can travel in the EV travel mode also in the second embodiment. As a result, necessity of the charge in the course can be precisely recognized, and uncertainty felt by the user (driver) can be effectively resolved. Moreover, the range of activity by using green energy can be appropriately presented (notified), and hence, particularly, the appropriate information meeting a rise in environmental awareness of the user (driver) can be presented (notified), and, for example, the intention to prioritize the use of the green electric power can be extremely easily satisfied (realized) also in the second embodiment. As a result, the user can appropriately contribute to the environment preservation.

c. Other Modifications

A description has been given of a case where the user (driver) moves around by using the electric power already charged in the battery of the PHV, more specifically, the privately generated green electric power, the green electric power, and the non-green electric power to drive the PHV in the first and second embodiments. In this case, the green electric power-use accessible range using green electric power may be extended particularly by purchasing (charging) green electric power at a public charge station during the activity. In other words, in this case, the electronic control unit 11 in this apparatus 10 cooperates with the navigation unit 15 to search for a charge station existing in a neighborhood of a border between the green electric power-use accessible range and the non-green electric power-use accessible range determined as described before (more specifically, on the green electric power-use accessible range side of the border) from among charge stations installed along the path on which the PHV is currently traveling. Then, the electronic control unit 11 uses the information presentation unit 12 to present the found charge station to the user (driver) for guidance.

Consequently, the user (driver) can move to the presented charge station in the EV travel mode using the green electric power. Then, the user (driver) can select and purchase the green electric power at the charge station installed at the movement destination to charge the battery of the PHV with the purchased green electric power. The battery remaining amount SOCg can be increased by the charge of the green electric power in this way, and hence the green electric power-use accessible range can be extended. Thus, the user (driver) can move around by using the PHV while the user (driver) is contributing more to the preservation of the earth environment.

Note that, even a non-green electric power may be partially (or entirely) considered as a green electric power by, for example, conversion based on the $CO_2$ emission trading or the like in this case as is well known. Thus, the electronic control unit 11 may communicate to/from a server or the like (not shown) provided outside via well-known network communication means (specifically, Internet communication means), thereby recognizing an apparent green electric power conversion rate of the non-green electric power based on the $CO_2$ emission trading or the like and apparently reducing the battery remaining amount SOCs and increasing the battery remaining amount SOCg. The battery remaining amount SOCg can be apparently increased even in this case, and hence the green electric power-use accessible range can be extended. Thus, the user (driver) can move around by using the PHV while the user (driver) is contributing to the preservation of the earth environment.

Moreover, in the first and second embodiments, when the traveling state of the PHV is changed from the EV travel mode to the HV travel mode, in other words, when the PHV moves from the non-green electric power-use accessible range to the HV accessible range during travel, the change in state (movement between accessible ranges) may be notified to the user (drive). Specifically, the electronic control unit 11 cooperates with the navigation unit 15 to acquire the current position of the PHV detected by the navigation unit 15. Then, when the electronic control unit 11 recognizes based on the acquired current position of the PHV that the PHV currently existing in any one of the areas of the privately generated green electric power-use accessible range, the green electric power-use accessible range, and the non-green electric power-use accessible range is likely to move, for example, from the non-green electric power-use accessible range to the HV accessible range, the electronic control unit 11 uses the information presentation unit 12 to notify the user (driver) of the change in travel mode of the PHV from the EV travel mode to the HV travel mode.

More specifically, for example, when the PHV exists in a neighborhood of a border between the non-green electric power-use accessible range and the HV accessible range and when the PHV is traveling toward the HV accessible range, in other words, when the battery remaining amount SOC of the battery of the PHV is decreasing to raise the need of using the driving power obtained by the internal combustion engine, the electronic control unit 11 supplies the information presentation unit 12 with information for outputting a message such as "EV travel mode will be soon switched to HV travel mode". As a result, the information presentation unit 12 notifies (presents) the user (driver) of the message by means of, for example, a sound output. As a result, the user (driver) can easily recognize the change (switching) of the travel mode of the PHV.

Further, in the case where the switching of the travel mode of the PHV can be notified to the user (driver) in this way, similarly, when the PHV switches, for example, from the EV travel mode using privately generated green electric power and green electric power to the travel mode using non-green electric power, in other words, when the PHV moves from the green electric power-use accessible range to the non-green electric power-use accessible range during travel in this embodiment, the electronic control unit 11 may notify the user (driver) of the switching of the used electric power. Specifically, also in this case, the electronic control unit 11 cooperates with the navigation unit 15 to acquire the current position of the PHV detected by the navigation unit 15. Then, when the electronic control unit 11 recognizes based on the acquired current position of the PHV that the PHV currently existing in any one of the areas of the privately generated green electric power-use accessible range and the green electric power-use accessible range is likely to move to the non-green electric power-use accessible range, the electronic control unit 11 uses the information presentation unit 12 to notify the user (driver) of the switching of the electric power used by the PHV traveling in the EV travel mode from the green electric power to the non-green electric power.

More specifically, for example, when the PHV exists in a neighborhood of a border between the green electric power-use accessible range and the non-green electric power-use accessible range and when the PHV is traveling toward the non-green electric power-use accessible range, in other words, when the battery remaining amount SOCg constructing the green electric power in the total battery remaining amount SOCr of the PHV is decreasing to raise the need of using the battery remaining amount SOCs corresponding to the non-green electric power, the electronic control unit 11 controls the information presentation unit 12 to output a message such as "Green electric power used state will be soon switched to non-green electric power used state". As a result, the appropriate information can be notified to the user (driver) prioritizing the preservation of the earth environment.

Note that, when the switching from the EV travel mode using the green electric power to the EV travel mode using the non-green electric power is notified to the user (driver) in this way, the electronic control unit 11 may confirm whether the user (driver) uses a public charge station to purchase the green electric power or not as described above. Specifically, the electronic control unit 11 uses the information presentation unit 12 to notify the user (driver) of a message representing the switching of the use state of electric power as described above, and to notify the user (driver) of a message, for example, "Do you purchase green electric power?". In a case where the user (driver) desires to purchase the green electric power in response to the message, the electronic control unit 11 cooperates with the navigation unit 15 to search for, for example, a charge station existing in a neighborhood of the border between the green electric power-use accessible range and the non-green electric power-use accessible range (more specifically, on the green electric power-use accessible range side of the border) from among charge stations installed along the path on which the PHV is currently traveling, and present the found charge station to the user (driver) for guidance.

As a result, the user (driver) can stop at the guided charge station to purchase the green electric power for charge. Thus, the battery remaining amount SOCg can be increased, and the green electric power-use accessible range can thus be extended. Consequently, the user (driver) can move around by using the PHV while surely contributing to the preservation of the earth environment.

Moreover, in the first and second embodiments, as described before, the battery total remaining amount SOCr, the battery remaining amount SOCg, the battery remaining amount SOCj, and the battery remaining amount SOCs are each divided by the electric mileage D to calculate a cruising distance assuming a movement on only an outbound path from the current position (departure point), namely, a movement to the farthest point from the current position (departure point). However, in this case, by further dividing the calculated cruising distance Lr, cruising distance Lg, cruising distance Lj, and cruising distance Ls by "2", travelable ranges (namely, accessible ranges) assuming a round trip of the PHV from the current position (departure point) to a certain point (destination) can be determined based on the respective cruising distances.

In the case where it is assumed that the PHV makes a round trip from the current position (departure point) to a certain point (destination), when the user (driver) drives the PHV in a direction further departing from the departure point beyond the destination, the electronic control unit 11 can use the information presentation unit 12 to notify the user (driver) of a message such as "If you travel further, you will probably be unable to go home only in EV travel mode", or "If you travel further, you will probably be unable to go home in EV travel mode using only green electric power". As a result, the appropriate information can be notified to the user (driver) prioritizing the preservation of the earth environment, thereby assisting the drive.

Moreover, such a case that the electronic control unit 11 uses, as the usage order of the battery remaining amounts SOC, starting from the current position of the PHV, the battery remaining amount SOCj represented by the privately generated green electric power charged amount information, the battery remaining amount SOCg represented by the green electric power charged amount information, and the battery remaining amount SOCs represented by the non-green electric power charged amount information in the direction departing from the current position of the PHV has been exemplified in the first and second embodiments. In this case, this apparatus 10 may include an input unit (setting means) for permitting various inputs by the user (driver) so that the user (driver) uses the input unit to set the usage order of the battery remaining amounts SOC. Particularly, in the first and second embodiments, the privately generated green electric power, the other green electric power, and the non-green electric power are distinguished from one another as the sources of the electric power charged in the battery. However, in a situation where the sources of the electric power charged in the battery are further divided, for example, a situation where the source of the green electric power is further divided into a green electric power by wind electric power generation, a green electric power by hydroelectric power generation, a green electric power by solar electric power generation, a green electric power by nuclear power generation, and the like, the user (driver) can set the usage order of the battery remaining amounts SOC depending on the intention and preference of the user (driver). As a result, because the user (driver) can select and set the usage order of the battery remaining amounts SOC, a user (driver) who desires to positively use the green electric power can appropriately reflect his/her own intention, and can move around by using the PHV while contributing to the preservation of the earth environment.

Further, such a case that the privately generated green electric power-use accessible range, the green electric power-use accessible range, and the non-green electric power-use accessible range (namely, the accessible ranges) based on the sources of the electric power are presented in a distinguishable manner, and the HV accessible range (namely, the accessible range) using the internal combustion engine is also presented in a distinguishable manner has been exemplified in the first and second embodiments. In this case, this apparatus 10 may simply present a travelable range using electric power charged in the battery without distinguishing its source and a travelable range using a driving power other than the electric power charged in the battery when the vehicle is the PHV or the fuel cell vehicle (FCV) (specifically, a driving power generated by the internal combustion engine by using fossil energy, and a driving power by an electric power generated by a fuel cell by using hydrogen energy) in a distinguishable manner. The user (driver) can extremely easily recognize the accessible range in the EV travel mode even in this case. As a result, necessity of the charge in the course can be precisely recognized, and uncertainty felt by the user (driver) can be effectively resolved. Moreover, the user (driver) who drives positively, for example, in the EV travel mode or by using the electric power generated by the fuel cell of the FVC, can act while contributing to the preservation of the earth environment.

In carrying out the present invention, the present invention is not limited to each of the above-mentioned embodiments and modifications, and different kinds of changes can be made without departing from an object of the present invention.

For example, when the PHV travels particularly in the EV travel mode, the accessible ranges (travelable ranges based on the cruising distances) depending on the battery remaining amounts SOC, which are information beneficial to the user (driver), are presented in the respective embodiments. The accessible ranges (travelable ranges based on the cruising distances) depending on the battery remaining amounts SOC are not limited to the PHV, and it should be understood that this apparatus 10 is applicable to an electric vehicle (EV) that travels only by a driving power of motors (including two-wheeled vehicles such as power-assisted bicycle and electric motorcycle) so that an accessible range (travelable range based on the cruising distance) depending on the battery remaining amount SOC is presented to a user (driver) using the electric vehicle (EV). Even in this case, this apparatus 10 can present the accessible range to the user (driver) at an appropriate timing, and the same effects as in the respective embodiments and modifications are expected.

Moreover, the electric power information acquisition unit 14 of this apparatus 10 acquires the electric power source identification information representing the source of the electric power to be charged in the battery via the smart meter installed on a charge station in the respective embodiments and modifications. In this case, in place of such a configuration that the electric power information acquisition unit 14 acquires the electric power source identification information via individual smart meters, for example, the electric power information acquisition unit 14 may be configured to include a communication unit for communication via an external network and to use the communication unit to acquire the electric power source identification information supplied from a server installed outside. As a result, it is not necessary to install the smart meter on each charge station, and the electric power information acquisition unit 14 can easily and quickly acquire the electric power source identification information from the external server. Note that, in the case where the electric power source identification information is acquired from the external server in this way, the electric power information acquisition unit 14 can acquire, for example, the battery remaining amount SOC detected by the charge state detection sensor B installed on the PHV side, and associate the acquired battery remaining amount SOC and the electric power source identification information acquired from the external server to each other, thereby appropriately recognizing the details of the battery total remaining amount SOCr.

Moreover, the cruising distance Lr, the cruising distance Lg, the cruising distance Lj, and the cruising distance Ls are simply calculated by respectively dividing the battery total remaining amount SOCr, the battery remaining amount SOCg, the battery remaining amount SOCj, and the battery remaining amount SOCs by the electric mileage D in the respective embodiments and modifications. In this case, it should be understood that the unique cruising distances respectively corresponding to the battery total remaining amount SOCr, the battery remaining amount SOCg, the battery remaining amount SOCj, and the battery remaining amount SOCs can be determined simply, and conversely, hitherto used various parameters (such as parameters representing inclinations of a road and parameters representing a traffic volume) may be used to calculate a detailed cruising distance. Even in this case, the same effects as in the respective embodiments and modifications are provided.

Further, the ranges in which the PHV can travel by using the total amounts of the respective energies, namely, the accessible ranges are presented (notified) to the user (driver) based on the current battery total remaining amount SOCr, battery remaining amount SOCg, battery remaining amount SOCj, battery remaining amount SOCs, and fuel remaining amount Fr in the respective embodiments and modifications. In contrast, for example, when the user (driver) uses the navigation unit 15 to set a destination, the user (driver) may designate the source of the electric power (green electric power or non-green electric power), and may designate the EV travel mode or the HV travel mode to the PHV. In this case, the navigation unit 15 cooperates with the electronic control unit 11 to present (notify) a travelable range determined by the source of the electric power in the travel mode designated by the user, and hence the user (driver) can set a destination to which the user (driver) can travel by using the energy intended by the user (driver), or set a destination by taking the charging in the course into consideration. Then, the navigation unit 15 searches for a path to the destination set in this way, and can guide the user (driver) along the found path.

The invention claimed is:

1. A plug-in hybrid vehicle that travels in a first travel mode and a second travel mode comprising:
 a drive assist apparatus superimposing and displaying an area on a vicinity map including a current position of the vehicle,
 a first sensor configured to determine first information regarding electric power stored in a battery, and
 a second sensor configured to determine second information regarding driving power of an internal combustion engine, wherein
 the drive assist apparatus includes:
  a display; and
  at least one electronic controller, by itself or cooperatively in association with one another, configured to:
   determine a first area that is a first maximum distance that can be traveled in the first travel mode based upon the first information and a second area that is a second maximum distance that can be traveled in the second travel mode based upon the first and second information; and
   superimpose and display the determined first and second areas on the vicinity map by delineating the determined first and second areas on the display, to present the areas to the driver of the vehicle,
 the first travel mode is an electric vehicle travel mode of the plug-in hybrid vehicle for traveling by only using driving power of a motor using the electric power charged in the battery from the outside of the vehicle,
 the second travel mode is an hybrid vehicle travel mode of the plug-in hybrid vehicle for traveling by using both the driving power of the motor and the driving power of the internal combustion engine,
 the displayed determined first and second areas surround the current position of the vehicle, and
 the second area is greater than and includes the first area.

2. The drive assist apparatus according to claim 1, wherein:
 the drive assist apparatus includes at least one of a navigation sensor and a smartphone.

3. A drive assist apparatus for a plug-in hybrid vehicle:
 the plug-in hybrid vehicle comprising:
 a battery chargeable from an outside of the vehicle;
 a motor driven by electric power charged in the battery;
 an internal combustion engine;
 a sensor to detect a state of charge of the battery; and
 the drive assist apparatus being configured to specify a current position of the vehicle and including:
  at least one electronic controller configured to, by itself or cooperatively in association with one another, calculate, based on the detected state of charge, a first maximum distance at which the vehicle can travel only by the motor using electric power charged from the outside of the vehicle; and
  a display superimposing on a map:
   the current position of the vehicle as a first circle whose radius is the calculated first maximum distance the plug-in hybrid vehicle can travel only by using the motor, and whose center is the current position of the vehicle;
   a first area having a first color inside the first circle; and
   a second area having a second color different from the first color outside the first circle and delineated by a second circle,
 wherein:
 the second area represents a second maximum distance that is travelable from the current position of the vehicle when the plug-in hybrid vehicle is operated using both the motor and internal combustion engine,
 the displayed first and second areas surround the current position of the vehicle, and
 the second area is greater than and includes the first area.

4. The drive assist apparatus according to claim 3, wherein:
 the drive assist apparatus includes at least one of a navigation sensor and a smartphone.

5. The drive assist apparatus according to claim 1, wherein the at least one electronic controller is configured to determine the first area by determining a plurality of first unique reachable points that are each reachable in the first travel mode and are separated from one another by a predetermined angular range in a circumferential direction.

6. The drive assist apparatus according to claim 5, wherein the at least one electronic controller is configured to determine the second area by determining a plurality of second unique reachable points that are each reachable in the second travel mode and are separated from one another by a predetermined angular range in a circumferential direction.

* * * * *